(12) United States Patent
Chen

(10) Patent No.: US 9,290,049 B2
(45) Date of Patent: Mar. 22, 2016

(54) BICYCLE HUB ASSEMBLY

(71) Applicant: Chosen Co., Ltd, Xianxi Township, Changhua County (TW)

(72) Inventor: Ching-Shu Chen, Xianxi Township, Changhua County (TW)

(73) Assignee: CHOSEN CO., LTD., Xianxi Township, Changhua County (TW)

( * ) Notice: Subject to any disclaimer, the term of this patent is extended or adjusted under 35 U.S.C. 154(b) by 0 days.

(21) Appl. No.: 14/192,039

(22) Filed: Feb. 27, 2014

(65) Prior Publication Data

US 2014/0246894 A1    Sep. 4, 2014

(30) Foreign Application Priority Data

Mar. 4, 2013   (TW) .............................. 102107527 A

(51) Int. Cl.
*F16D 41/30* (2006.01)
*B60B 27/00* (2006.01)
*B60B 27/04* (2006.01)

(52) U.S. Cl.
CPC .............. *B60B 27/047* (2013.01); *F16D 41/30* (2013.01); *B60B 2900/113* (2013.01); *B60B 2900/116* (2013.01)

(58) Field of Classification Search
CPC .............. B60B 27/047; B60B 27/0047; B60B 2900/116; F16D 41/24

USPC ............ 192/64, 46; 301/110.5; 403/355–358, 403/318, 319, 359.6, 359.1
See application file for complete search history.

(56) References Cited

U.S. PATENT DOCUMENTS

| 2003/0042100 A1* | 3/2003 | Juan ................................ 192/64 |
| 2011/0052316 A1* | 3/2011 | Chen .............................. 403/356 |
| 2013/0056320 A1* | 3/2013 | Chen ............................. 192/45.1 |
| 2014/0042799 A1* | 2/2014 | Chen ........................... 301/110.5 |

* cited by examiner

*Primary Examiner* — Richard Lorence
*Assistant Examiner* — Lillian Nguyen
(74) *Attorney, Agent, or Firm* — Muncy, Geissler, Olds & Lowe, P.C.

(57) ABSTRACT

A bicycle hub assembly includes a hub shell defining a toothed drive member mounting hole and a locating groove, a locating member having a positioning portion accommodated in the locating groove of the hub shell, and a toothed drive member having a first locating portion fastened to the positioning portion of the locating member and a plurality of teeth. In an alternate form of the invention, the bicycle hub assembly includes a hub shell defining therein a toothed drive member mounting hole and a plug hole; a locating member having a positioning portion and a plug portion that is plugged into the plug hole of the hub shell, and a toothed drive member having a first locating portion fastened to the positioning portion of the locating member and a plurality of teeth formed therein.

6 Claims, 9 Drawing Sheets

BICYCLE HUB ASSEMBLY

BACKGROUND OF THE INVENTION

1. Field of the Invention

The present invention relates to bicycle technology, and more particularly to a bicycle hub assembly.

2. Description of the Related Art

A conventional bicycle hub assembly includes a hub shell and a toothed drive member detachably mounted in the hub shell. The connection between the hub shell and the toothed drive member can be achieved by a first method where the toothed drive member is screw-connected into the hub shell, or a second method where the toothed drive member is press-fitted into a mating hole in the huh shell and prohibited from rotation relative to the hub shell.

In the aforesaid two methods for the connection between the hub shell and the toothed drive member, the screw connection method complicates the mounting and dismounting operations between the hub shell and the toothed drive member; the mating hole press-fit connection method complicates the processing of the mating structure between the outer appearance of the toothed drive member and the configuration of the mating hole of the hub shell. Further, in either of the aforesaid two methods, the concentricity and stability of the assembly are slightly insufficient.

That is, there is room for improvement on the composition structure of the aforesaid bicycle huh assembly with the mating freewheel.

SUMMARY OF THE INVENTION

The present invention has been accomplished under the circumstances in view. It is the main object of the present invention to provide a bicycle hub assembly, which enables a hub shell and a toothed drive member to be conveniently, accurately and steadily assembled and, which facilitates the processing of the structure of the bicycle hub assembly.

To achieve this and other objects of the present invention, a bicycle hub assembly of the invention comprises a hub shell defining a toothed drive member mounting hole and a locating groove, a locating member having a positioning portion accommodated in the locating groove of the hub shell, and a toothed drive member having a first locating portion fastened to the positioning portion of the locating member and a plurality of teeth formed therein.

In an alternate form of the present invention, the bicycle hub assembly comprises a hub shell defining a toothed drive member mounting hole and a plug hole, a locating member having a positioning portion and a plug potion that is plugged into the plug hole of the hub shell, and a toothed drive member having a first locating portion fastened to the positioning portion of the locating member and a plurality of teeth formed therein.

Other advantages and features of the present invention will be fully understood by reference to the following specification in conjunction with the accompanying drawings, in which like reference signs denote like components of structure.

DETAILED DESCRIPTION OF THE INVENTION

Figure 1:
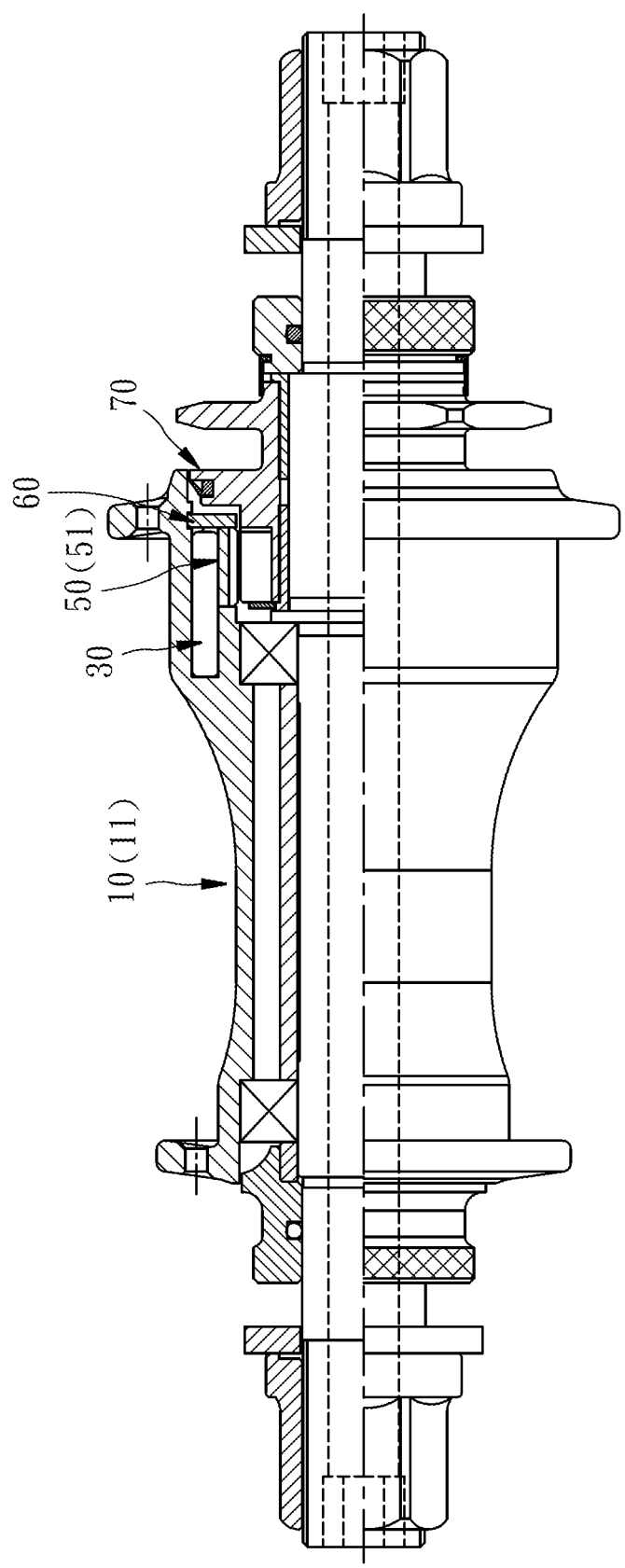
FIG. 1 is a sectional assembly view of a bicycle hub assembly in accordance with a first embodiment of the present invention.
Figure 2:
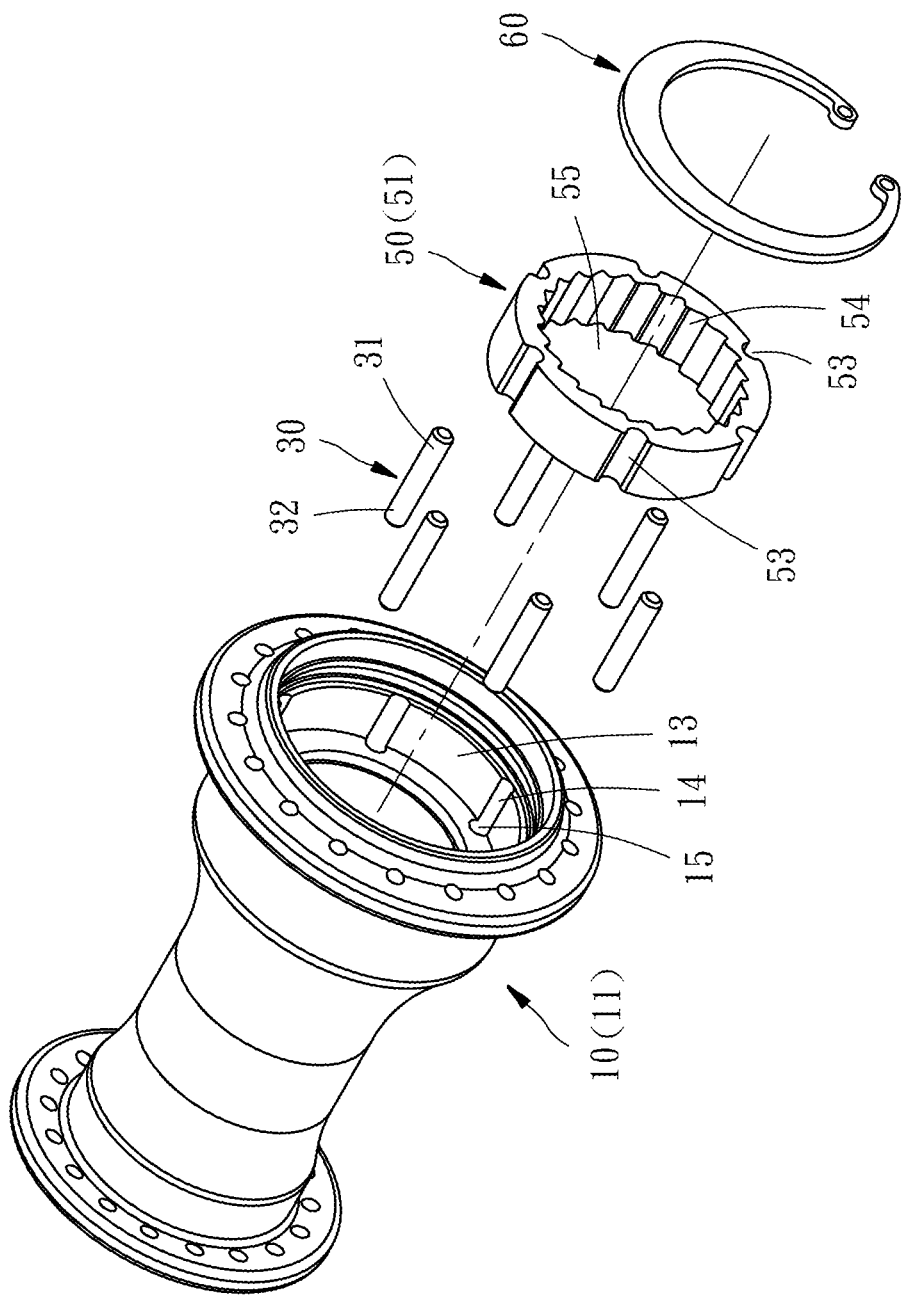
FIG. 2 is an exploded view of the bicycle hub assembly in accordance with the first embodiment of the present invention.
Figure 3:
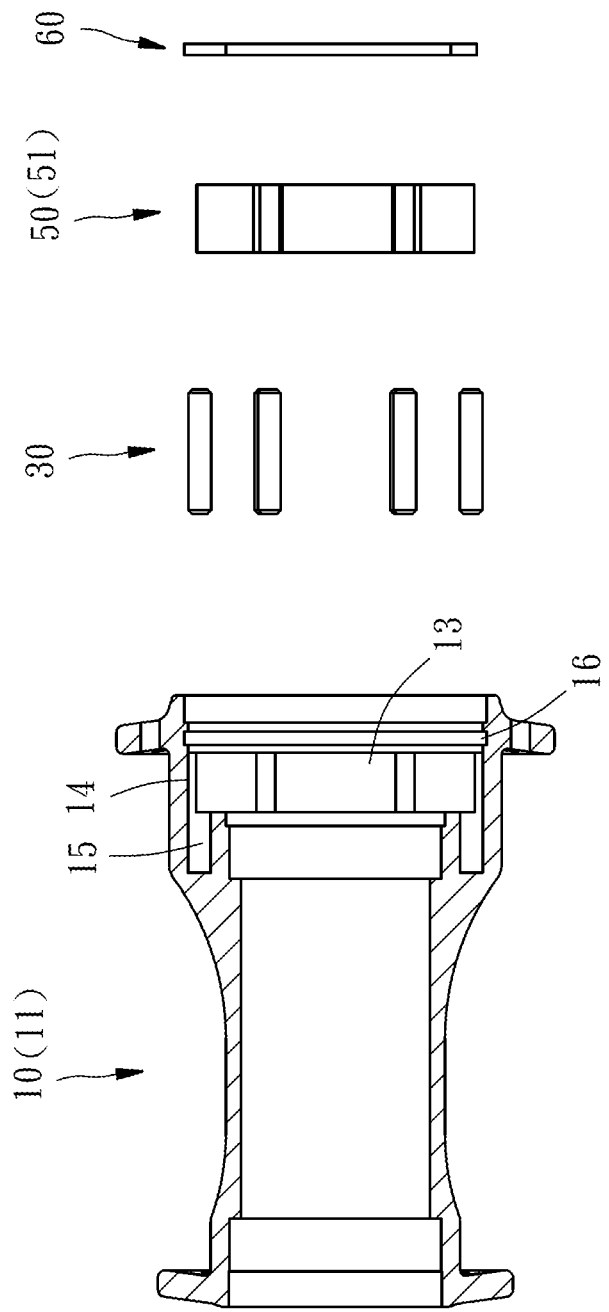
FIG. 3 is a sectional side view of FIG. 2.

Referring to FIGS, 1-5, a bicycle hub assembly in accordance with a first embodiment of the present invention is shown. The bicycle hub assembly comprises a hub shell 10, a plurality of locating members 30, a toothed drive member 50, and a stopper member 60.

The hub shell 10 comprises a hub shell body 11. The hub shell body 11 defines a toothed drive member mounting hole 13, a plurality of locating grooves 14, a plurality of plug holes 15 and a stopper member mounting hole 16. The locating grooves 14 of the hub shell 10 are arranged in an equiangularly spaced relationship. The plug holes 15 of the hub shell 10 are also arranged in an equiangularly spaced relationship. Further, in this embodiment, the locating grooves 14 and the plug holes 15 have the same diameter and are respectively axially aligned.

Each locating member 30 has a positioning portion 31 positioned in one respective locating groove 14 of the hub shell 10. In this embodiment, the positioning portion 31 of each locating member 30 has a circular cross section. Each locating member 30 further has a plug portion 32 connected with the positioning portion 31 and plugged into one respective plug hole 15 of the hub shell 10.

The toothed drive member 50 comprises a first ring 51. The first ring 51 defines a plurality of first locating portions 53 respectively made in the form of a respective locating groove and respectively secured to the positioning portions 31 of the locating members 30, and a plurality of teeth 54 that are spaced around an inner perimeter of the toothed drive member 50. The first locating portions 53 of the toothed drive member 50 are arranged in the outer perimeter of the toothed drive member 50 over an area larger than one half the circumference. Further, the first locating portions 53 of the toothed drive member 50 are arranged in an equiangularly spaced relationship.

The stopper member 60 in this embodiment is a C-shaped retaining ring mounted in the stopper member mounting hole 16 of the hub shell 10 to stop the locating member 30 and the toothed drive member 50 in place, preventing them from falling out of the hub shell 10.

The operation and function of the bicycle hub assembly in accordance with the first embodiment of the present invention are outlined hereinafter:

The bicycle hub assembly enables a freewheel 70 to be rotated in one direction. The freewheel 70 comprises a freewheel body 71, a plurality of pawls 73 and spring leaves 72. The pawls 73 are respectively engageable with the teeth 54 of the toothed drive member 50 to rotate the bicycle hub assembly in one direction.

Figure 6:
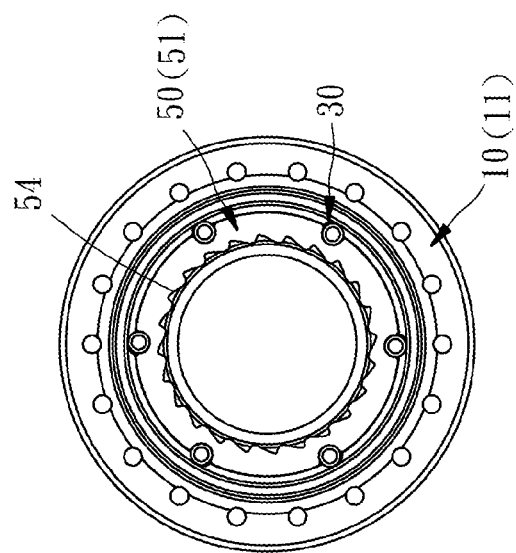
FIG. 6 is similar to FIG. 4, illustrating the mounting direction of the bicycle hub assembly reversed.
Figure 5:
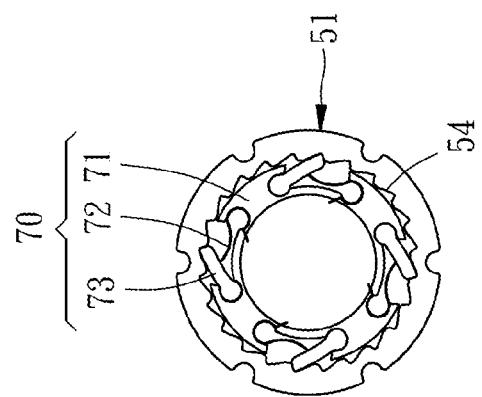
FIG. 5 is a sectional view of the first embodiment of the present invention, illustrating the toothed drive member of the bicycle hub assembly mounted on a freewheel.
Figure 4:
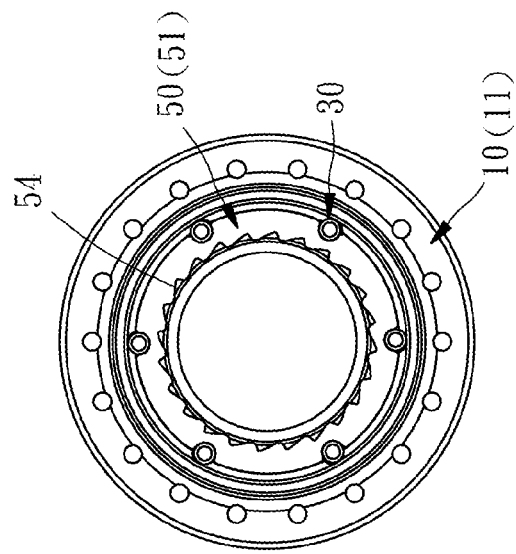
FIG. 4 is a sectional end view of the bicycle hub assembly in accordance with the first embodiment of the present invention.

Referring to FIG. 6, for left-right alternation or changing drive direction, detach the toothed drive member 50, and then mount the other side of the toothed drive member 50 in the hub shell 10, and thus the bicycle hub assembly is set for driving in the opposite direction as shown in FIG. 6. Thus, the toothed drive member 50 can be conveniently mounted in the hub shell 10 in one of two reversed directions, enabling the hub shell 10 to be selectively installed in the left or right side of the bicycle.

Figure 7:
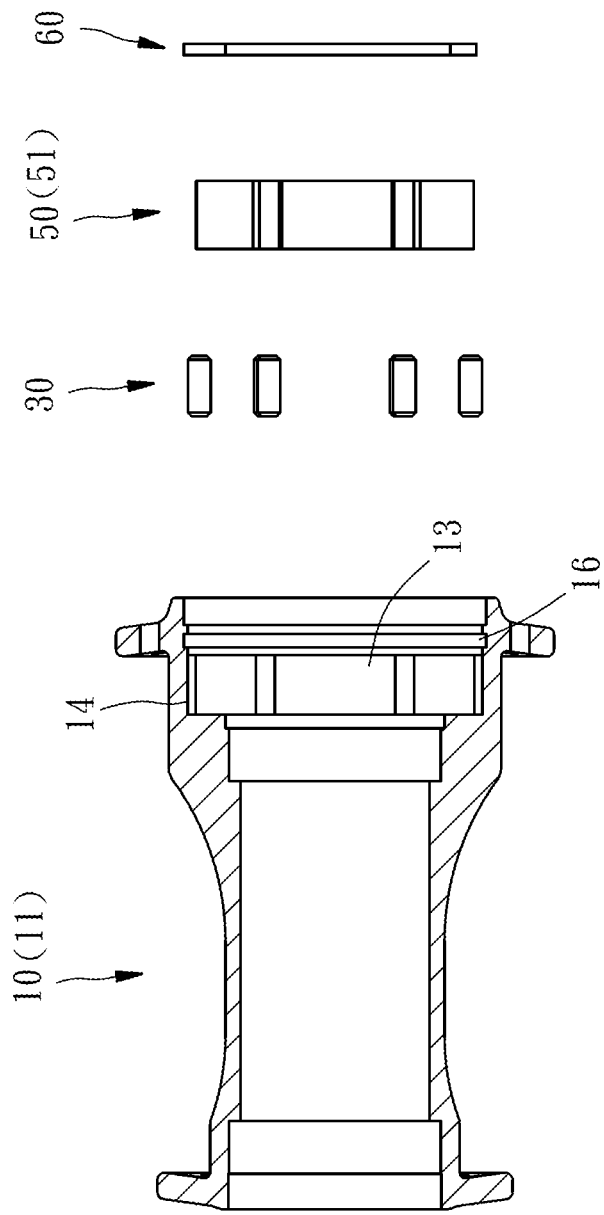
FIG. 7 is a sectional exploded view of a bicycle hub assembly in accordance with a second embodiment of the present invention.

Referring to FIG. 7, a bicycle hub assembly in accordance with a second embodiment of the present invention is shown. This second embodiment is substantially similar to the aforesaid first embodiment with the exception that: the hub shell 10 simply comprises the aforesaid locating grooves 14 without the aforesaid plug holes 15; the length of the locating members 30 is relatively shorter than that of the aforesaid first embodiment. Thus, this second embodiment eliminates the plug hole processing process and saves the consumption of material for the locating member 30, and can achieve the same effect of enabling the toothed drive member 50 to be accurately and steadily installed in the hub shell 10.

Figure 8:
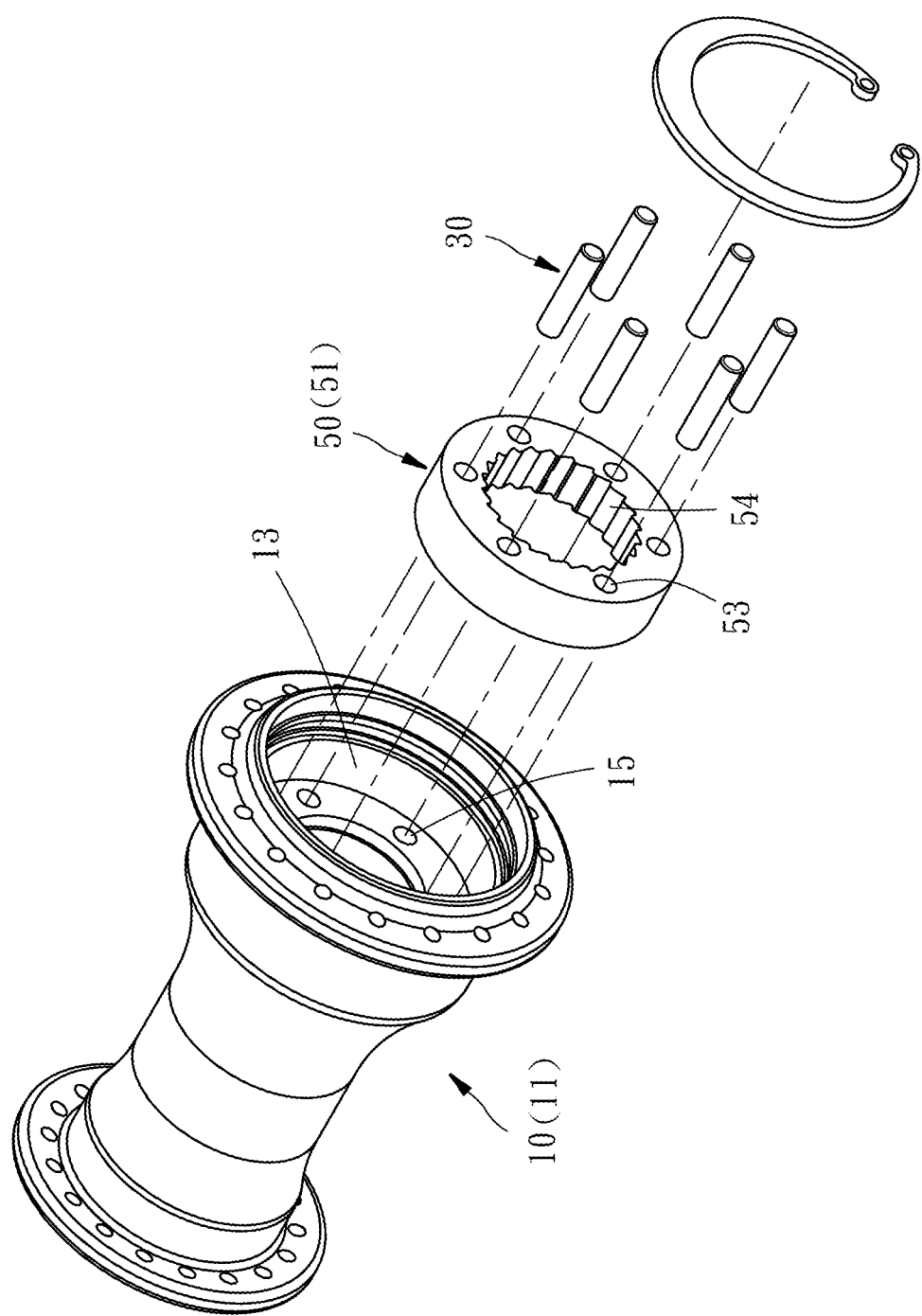
FIG. 8 is an exploded view of a bicycle hub assembly in accordance with a third embodiment of the present invention.

Referring to FIG. 8, a bicycle hub assembly in accordance with a third embodiment of the present invention is shown. This third embodiment is substantially similar to the aforesaid first embodiment with the exception that: the hub shell 10 simply comprises the aforesaid plug holes 15 without the aforesaid locating grooves 14; the length of the locating members 30 remains unchanged; the first locating portions 53 of the toothed drive member 50 are respectively made in the form of a locating hole instead of the locating groove.

Figure 9:
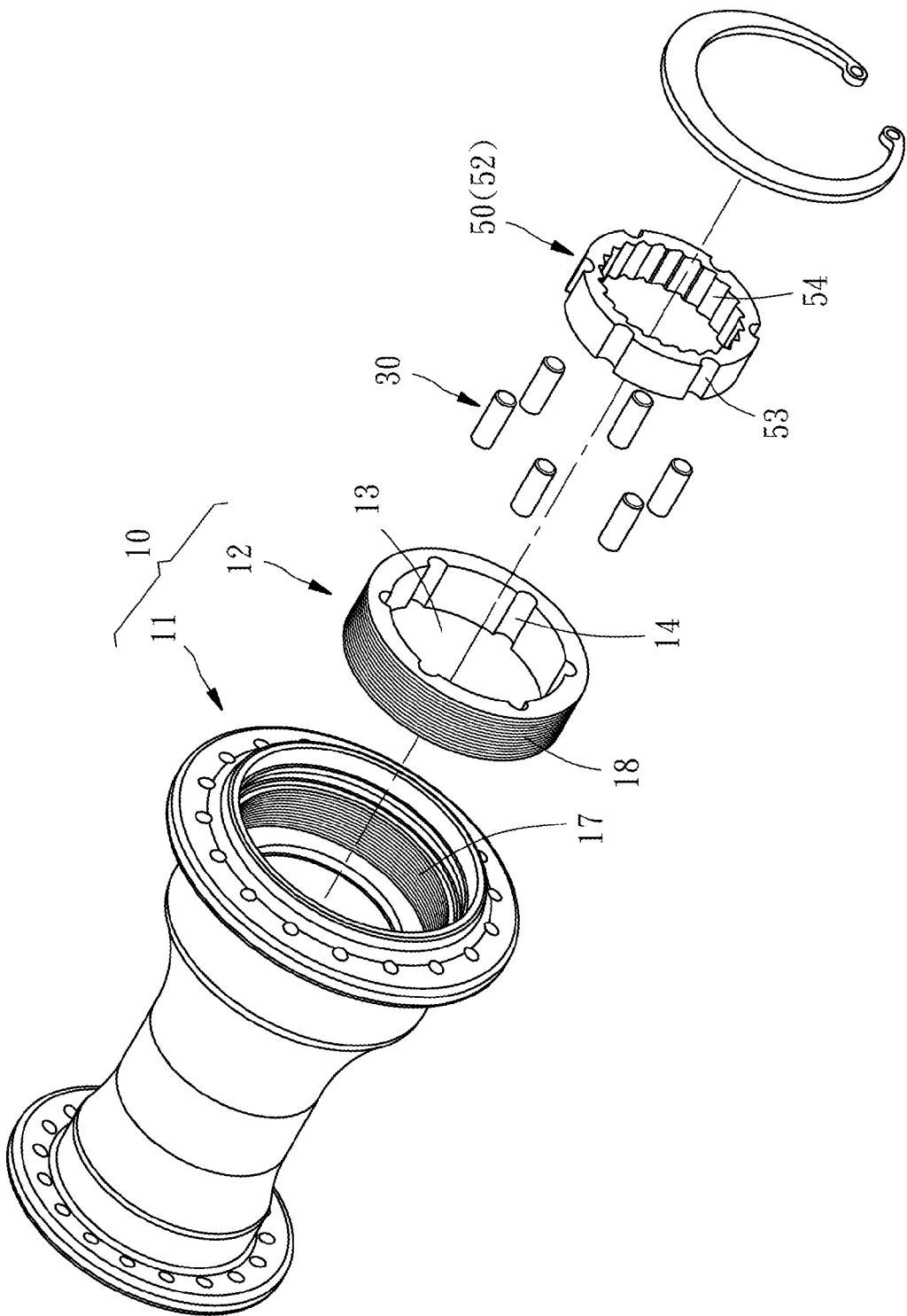
FIG. 9 is an exploded view of a bicycle hub assembly in accordance with a fourth embodiment of the present invention.

Referring to FIG. 9, a bicycle hub assembly in accordance with a fourth embodiment of the present invention is shown. This fourth embodiment is substantially similar to the aforesaid first embodiment with the exception that: in addition to the aforesaid hub shell body 11, the hub shell 10 further comprises a spacer member 12; the hub shell body 11 of the hub shell 10 further defines therein a spacer member mounting hole 17; the spacer member 12 comprises a hub shell fastening portion 18 made in the form of, for example, but not limited to, an outer thread and fastened to the spacer member mounting hole 17 of the hub shell 10; the aforesaid locating grooves 14 and plug holes 15 are formed in the spacer member 12 instead of forming in the hub shell 10, i.e., the spacer member 12 defines therein a toothed drive member mounting hole 13 and a plurality of locating grooves 14. The toothed drive member mounting hole 13 of the spacer member 12 is provided for the mounting of the toothed drive member 50; the locating grooves 14 of the spacer member 12 are provided for the positioning of the locating member 30.

Figure 10:
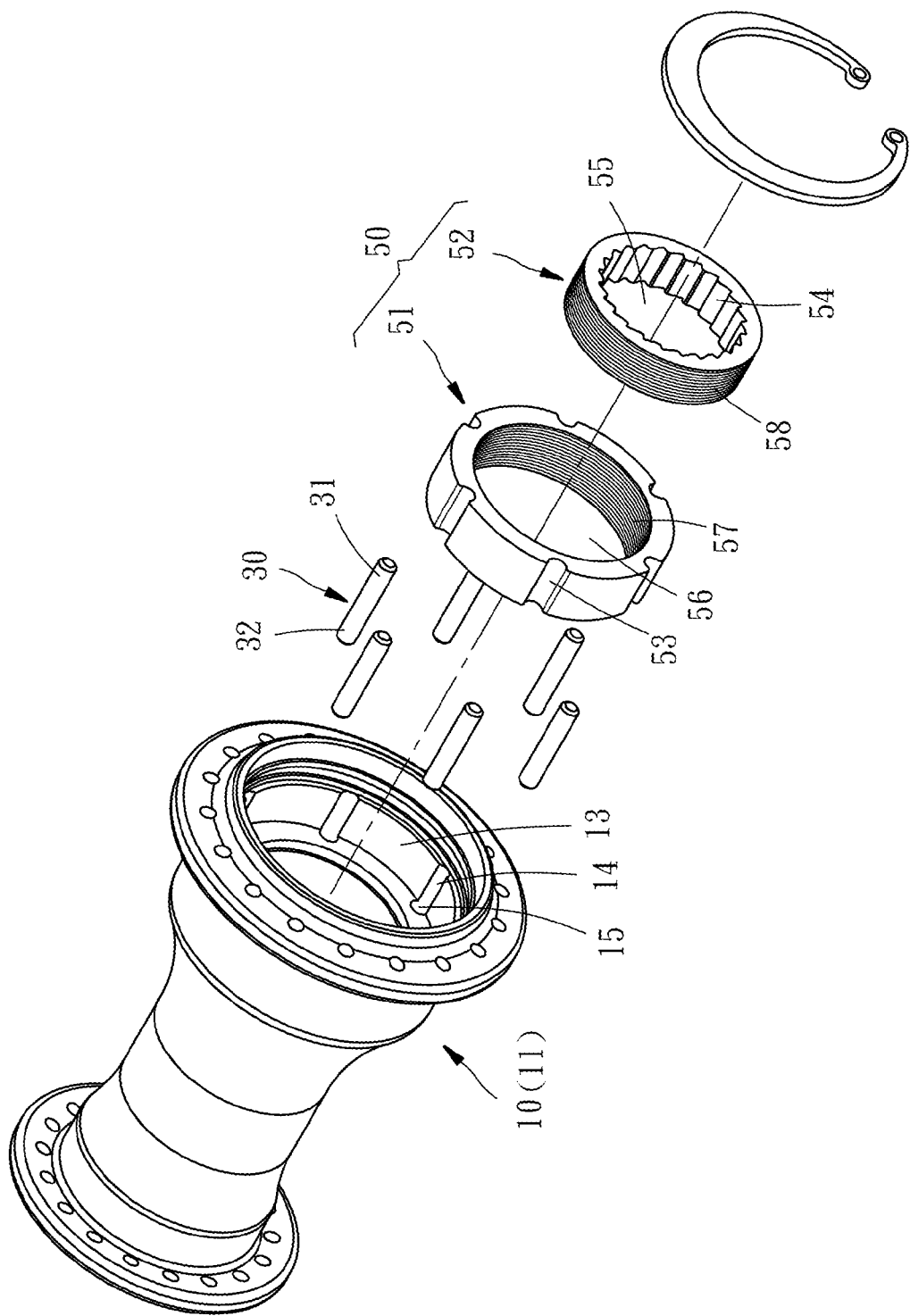
FIG. 10 is an exploded view of a bicycle hub assembly in accordance with a fifth embodiment of the present invention.

Referring to FIG. 10, a bicycle hub assembly in accordance with a fifth embodiment of the present invention is shown. This fifth embodiment is substantially similar to the aforesaid first embodiment with the exception that: the toothed drive member 50 is formed of a first ring 51 and a second ring 52; the aforesaid first locating portions 53 are formed on the first ring 51; the aforesaid teeth 54 are formed in the second ring 52. Further, the first ring 51 and the second ring 52 can be joined together by any of a variety of known techniques. In this embodiment, the first ring 51 of the toothed drive member 50 is screw-connected to the second ring 52, i.e., the first ring 51 of the toothed drive member 50 has a second positioning portion 57 made in the form of a female thread, and the second ring 52 has a third positioning portion 58 made in the form of a male thread for engagement with the female thread of the second positioning portion 57.

Figure 11:
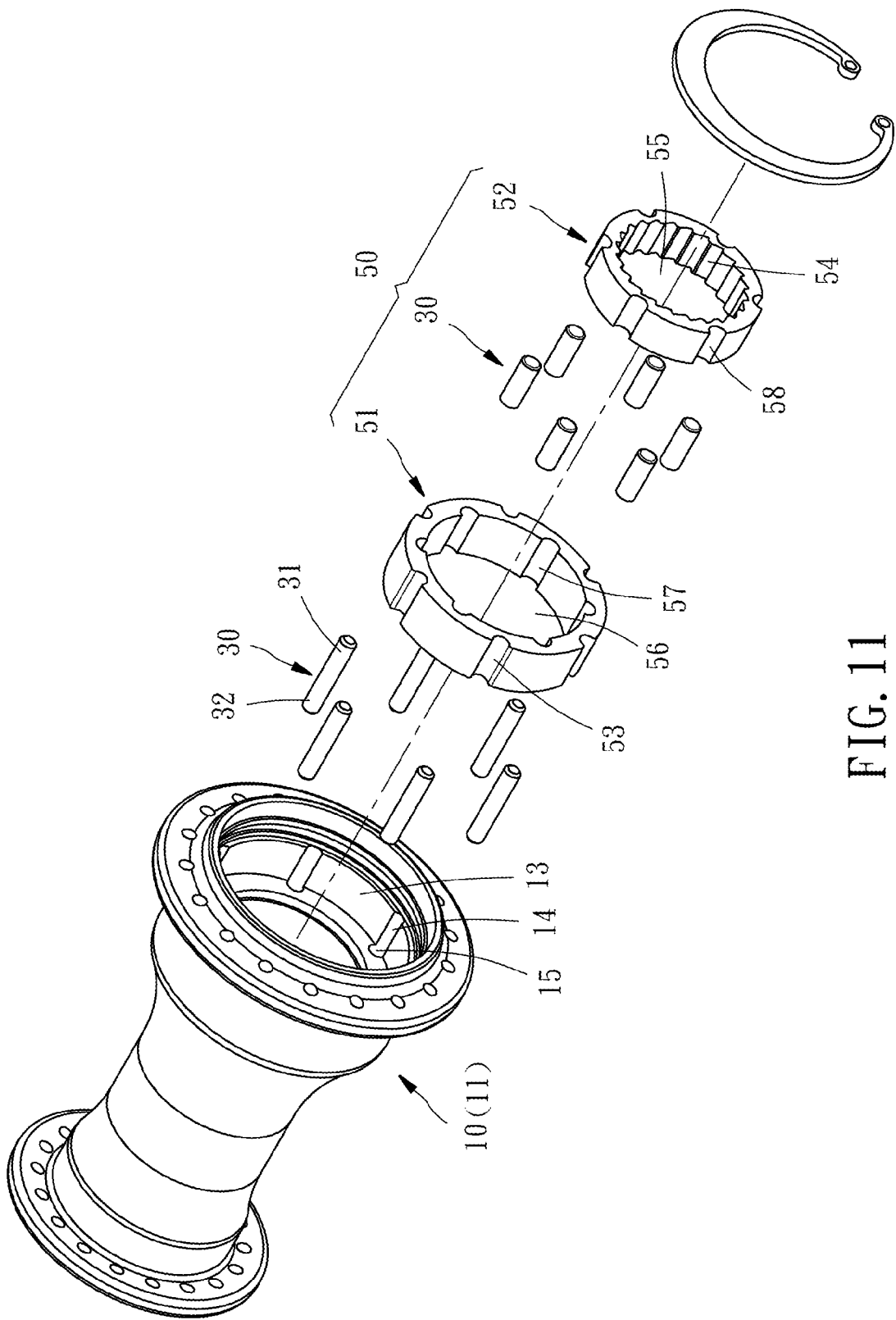
FIG. 11 is an exploded view of a bicycle hub assembly in accordance with a sixth embodiment of the present invention.

Referring to FIG. 11, a bicycle hub assembly in accordance with a sixth embodiment of the present invention is shown. This sixth embodiment is substantially similar to the aforesaid first embodiment with the exception that: the toothed drive member 50 comprises a first ring 51 and a second ring 52; the aforesaid first locating portions 53 are formed on the first ring 51; the aforesaid teeth 54 are formed in the second ring 52. Further, the first ring 51 and the second ring 52 can be joined together by any of a variety of known techniques. In this embodiment, the first ring 51 of the toothed drive member 50 comprises a plurality of second positioning portions 57 respectively made in the form of a semicircular groove; the second ring 52 comprises a plurality of third positioning portions 58 respectively made in the form of a semicircular groove; the toothed drive member 50 further comprises a plurality of relatively shorter locating members 30 respectively positioned in between the second positioning portions 57 of the first ring 51 and the third positioning portions 58 of the second ring 52. Further, in the case that the locating members 30 have the same outer diameter, the toothed drive member mounting hole 13 of the hub shell 10 can achieve a common share effect.

Except the aforesaid embodiments, the invention can also be made in any of various other alternate forms as follows:

For example, the cross section of the positioning portions 31 of the locating members 30 is not limited to the circular shape, and can be made in any other shape.

Alternatively, the locating grooves 14 and plug holes 15 of the hub shell 10 can be circularly shaped but not arranged in a coaxial relationship.

Further, the locating grooves 14 and plug holes 15 of the hub shell 10 are not necessarily made to have the same shape, they can be made having different configurations.

Further, the number of the locating groove 14, the number of the plug hole 15, the number of the locating member 30 and the number of the first locating portion 53 are not necessary to be multiple, at least one is acceptable to achieve the same objects and effects of the present invention.

Further, the location of the teeth 54 of the toothed drive member 50 is not limited to the inner perimeter of the toothed drive member 50, i.e., the teeth 54 can be formed in the outer perimeter or one lateral side of the toothed drive member 50.

In conclusion, through the description of above embodiments of the present invention, everybody can understand that the bicycle hub assembly of the present invention enables the hub shell and the toothed drive member to be conveniently, accurately and steadily assembled together. Further, the bicycle hub assembly of the present invention facilitates processing, is non-obvious and involves an inventive step.

What is claimed is:
1. A bicycle hub assembly, comprising:
a hub shell comprising a toothed drive member mounting hole and a locating groove;
a locating member comprising a positioning portion accommodated in said locating groove of said hub shell; and
a toothed drive member comprising a first locating portion fastened to said positioning portion of said locating member and a plurality of teeth formed therein, wherein said hub shell further comprises a plug hole and said locating member further comprises a plug portion connected with said positioning portion and plugged into said plug hole of said hub shell, wherein the positioning portion of the locating member is a circular positioning pin and the plug portion of the locating member is a circular plug pin coaxially and integrally formed with the circular positioning pin, wherein the locating member is detachably coupled to the hub shell and the locating member is detachably coupled with the toothed drive member, wherein the plug hole of the hub shell is a complete circular plug hole into which the circular plug pin is inserted in a manner that a circumferential periphery of the circular plug pin is totally in contact with a circumferential wall of the complete circular plug hole, wherein the locating groove of the hub shell is an opened groove having a semicircular cross-section and a radius equal to a radius of the circular positioning pin; the locating groove is coaxial with the circular positioning pin, and wherein the first locating portion of the toothed drive member is an opened groove having a semicircular cross-section and a radius equal to the radius of the circular positioning pin; the first locating portion of the toothed drive member is coaxial with the circular positioning pin.

2. The bicycle hub assembly as claimed in claim 1, wherein the outer diameter of said plug portion of said locating member is larger than, equal to, or smaller than the outer diameter of said positioning portion.

3. The bicycle hub assembly as claimed in claim 1, further comprising a stopper member mounted in said hub shell and adapted to stop said locating member and said toothed drive member in place.

4. The bicycle hub assembly as claimed in claim 3, wherein said hub shell further comprises a stopper member mounting hole; said stopper member is mounted in said stopper member mounting hole of said hub shell.

5. The bicycle hub assembly as claimed in claim 1, wherein said toothed drive member is formed of a first ring and a second ring; said first locating portion is located on said first ring; said teeth are located on said second ring.

6. The bicycle hub assembly as claimed in claim 5, wherein said first ring of said toothed drive member comprises a second positioning portion; said second ring comprises a third positioning portion; said toothed drive member further comprises a locating member plugged into said second positioning portion of said first ring and said third positioning portion of said second ring.

* * * * *